Jan. 14, 1941.  F. R. MAXWELL  2,228,472
INTERNAL COMBUSTION ENGINE
Filed Sept. 26, 1939  7 Sheets-Sheet 3
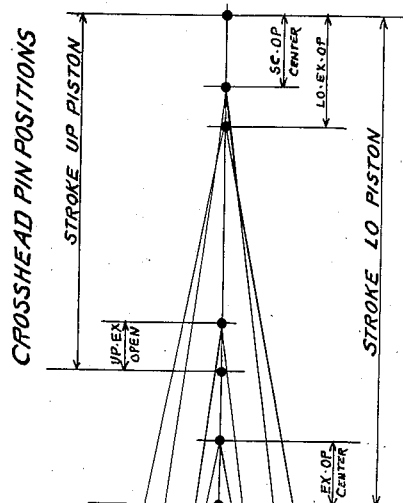
FIG. 4.
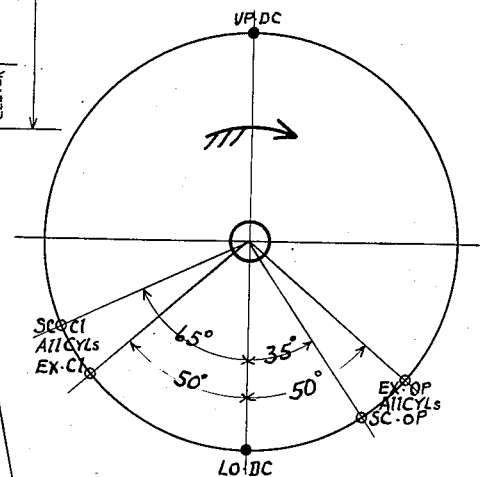
FIG. 4A.
CRANKS 165° APART
FORWARD
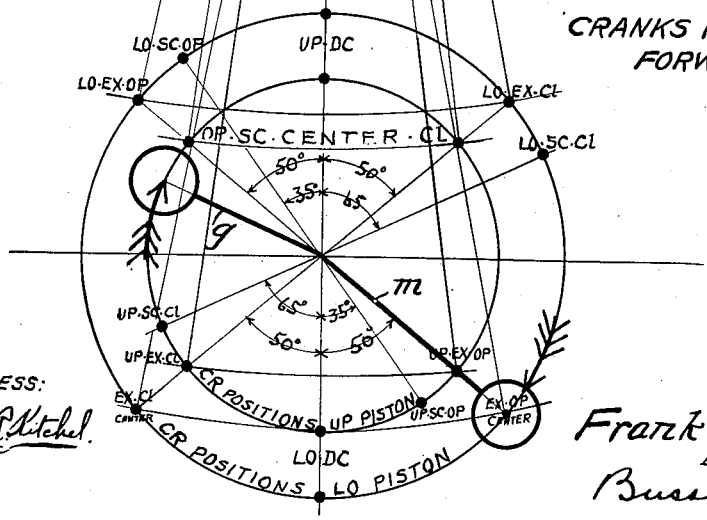
INVENTOR
Frank R. Maxwell
BY
Busser & Harding
ATTORNEYS.
WITNESS:
R. R. Kitchel

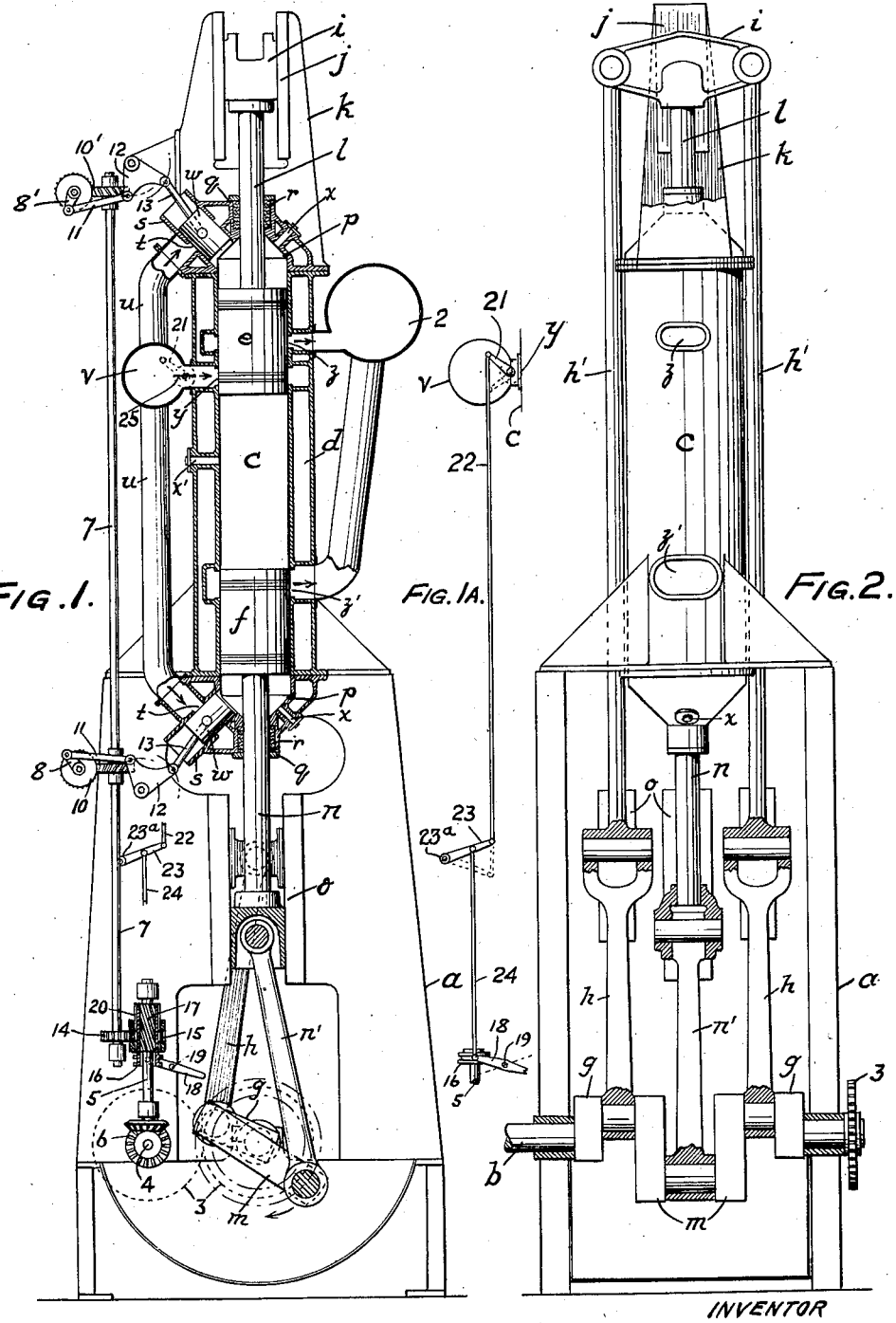

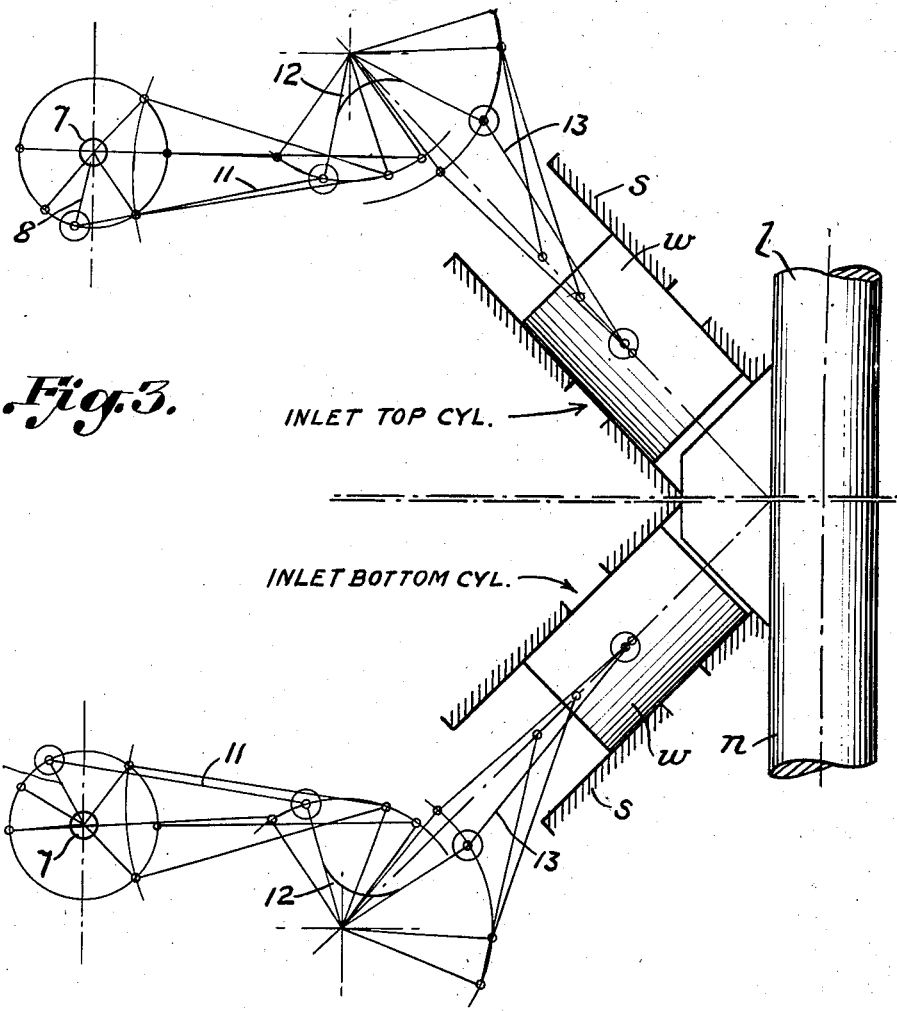

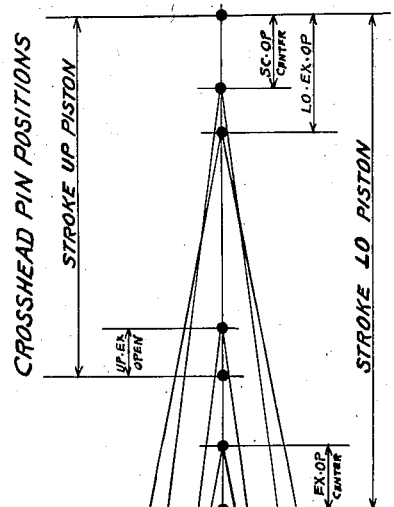
FIG.5.
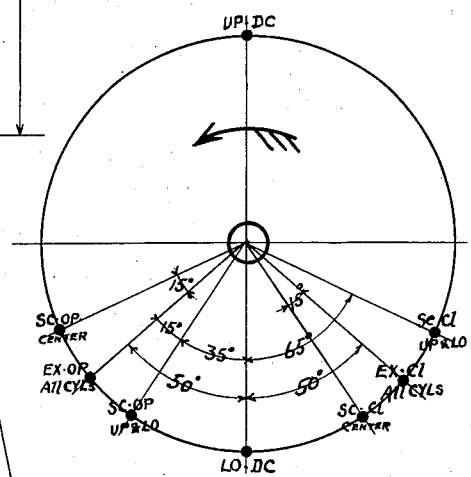
FIG.5A.
CRANKS 165° APART
REVERSE
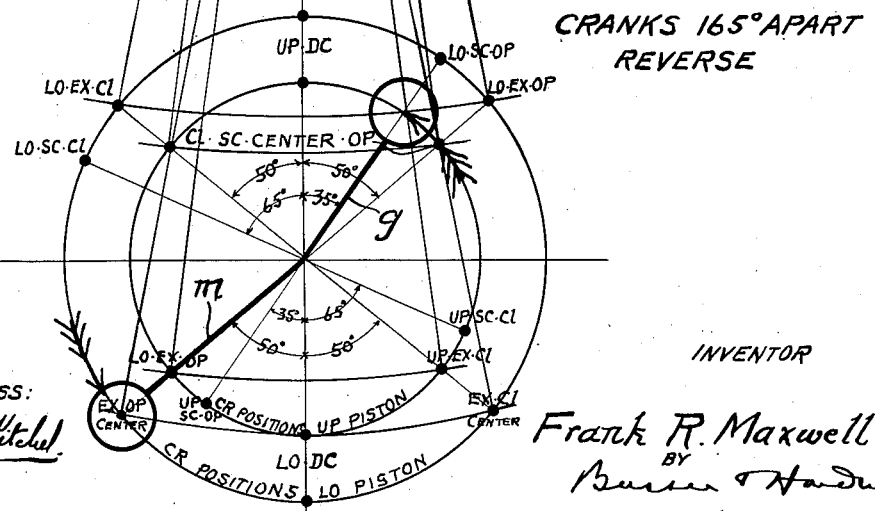
INVENTOR
Frank R. Maxwell
BY
Burtin & Harding
ATTORNEYS.

Jan. 14, 1941.  F. R. MAXWELL  2,228,472
INTERNAL COMBUSTION ENGINE
Filed Sept. 26, 1939  7 Sheets-Sheet 6
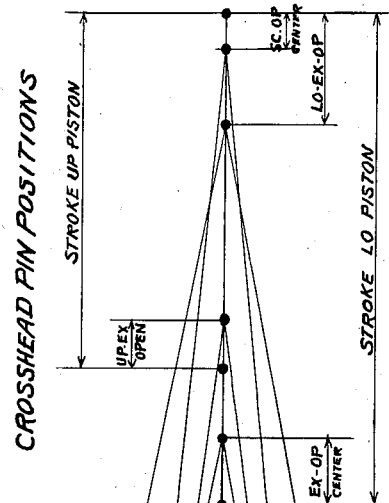
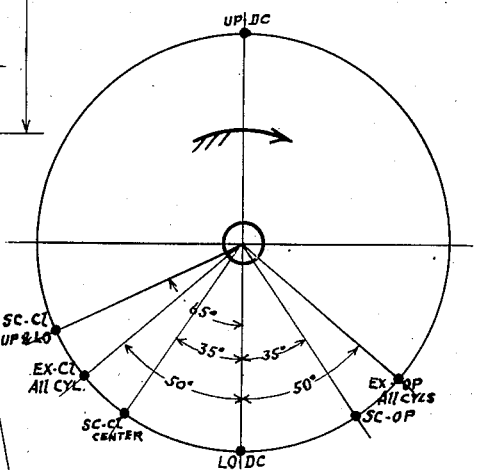
FIG. 7.  FIG. 7A.
CRANKS 180° APART
FORWARD
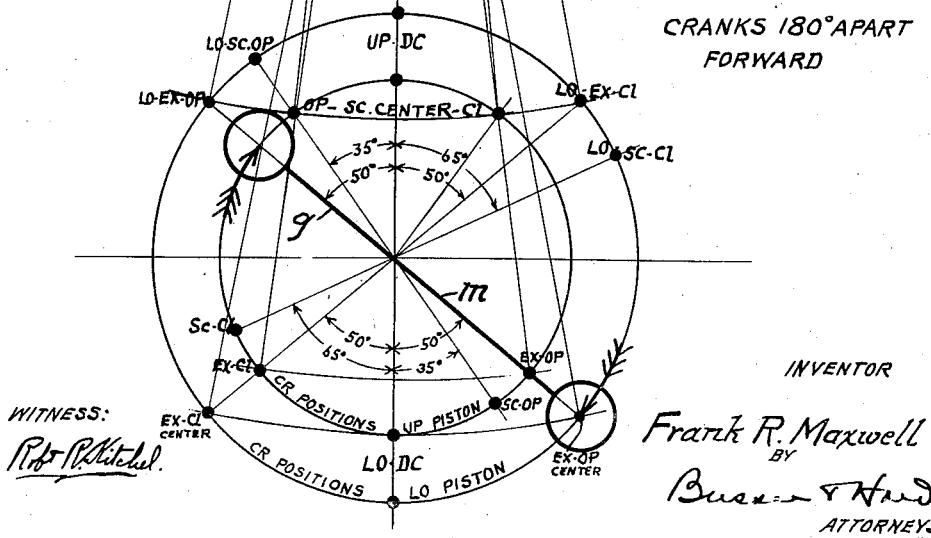
INVENTOR
Frank R. Maxwell
BY
Busser & Harding
ATTORNEYS.
WITNESS:
Robt R Mitchel Jan. 14, 1941.    F. R. MAXWELL    2,228,472
INTERNAL COMBUSTION ENGINE
Filed Sept. 26, 1939    7 Sheets-Sheet 7

INVENTOR
Frank R. Maxwell
BY
Busser & Harding
ATTORNEYS.

Patented Jan. 14, 1941

2,228,472

UNITED STATES PATENT OFFICE 2,228,472

INTERNAL COMBUSTION ENGINE

Frank R. Maxwell, Rose Valley, Pa., assignor to Sun Shipbuilding & Dry Dock Company, Chester, Pa., a corporation of Pennsylvania Application September 26, 1939, Serial No. 296,545

12 Claims. (Cl. 123—51)

This invention relates to an improvement in internal combustion engines and more particularly to an improvement in Diesel engines of the opposed piston type.

Generally speaking, this invention has as its principal object the provision of a double acting Diesel engine of the opposed piston type whereby the power of such an engine may be more than doubled without any substantial increase in the overall size and weight of the engine.

Secondary objects of this invention, which will appear from the detailed disclosure hereinafter, will include the provision of means whereby the engine may be readily arranged for operation in reverse on either full or half power.

The engine in accordance with this invention will lend itself most effectively to marine use due to its relatively high power with relation to its size and its capacity for operation in reverse at half or full power.

Having now indicated in a general way the nature and purpose of this invention, I will proceed to a detail description of a preferred embodiment thereof with reference to the accompanying drawings in which:

Figure 1 is a vertical section of an engine embodying this invention and in which the cranks are offset 15°.

Figure 1A is a view showing means for closing off the scavenging air port to the center cylinder of the engine shown in Figure 1.

Figure 2 is a view, partly in section, taken at right angles to that of Figure 1.

Figure 3 is a diagrammatic view illustrating the cycle of operation of the scavenging air valve for the bottom cylinder of the engine shown in Figures 1 and 2.

Figure 3A is a diagrammatic view illustrating the cycle of operation of the scavenging air valve for the top cylinder of the engine shown in Figures 1 and 2.

Figure 4 is a diagrammatic view showing the sequence of events more particularly scavenging and exhaust referred to the cranks and crosshead pins occurring in the forward operation of the engine shown in Figures 1 and 2.

Figure 4A is a diagrammatic view of the events shown in Figure 4 referred to a common crank.

Figure 5 is a diagrammatic view of the sequence of events more particularly scavenging and exhaust referred to the cranks and crosshead pins occurring in the operation of the engine shown in Figures 1 and 2 in reverse.

Figure 5A is a diagrammatic view of the events shown in Figure 5 referred to a common crank.

Figure 7 is a diagrammatic view showing the sequence of events more particularly scavenging and exhaust referred to the crank and crosshead pins occurring in the forward operation of the engine shown in Figures 1 and 2 where the cranks are set 180° apart.

Figure 7A is a diagrammatic view of the events shown in Figure 5 referred to a common crank.

Figure 6:
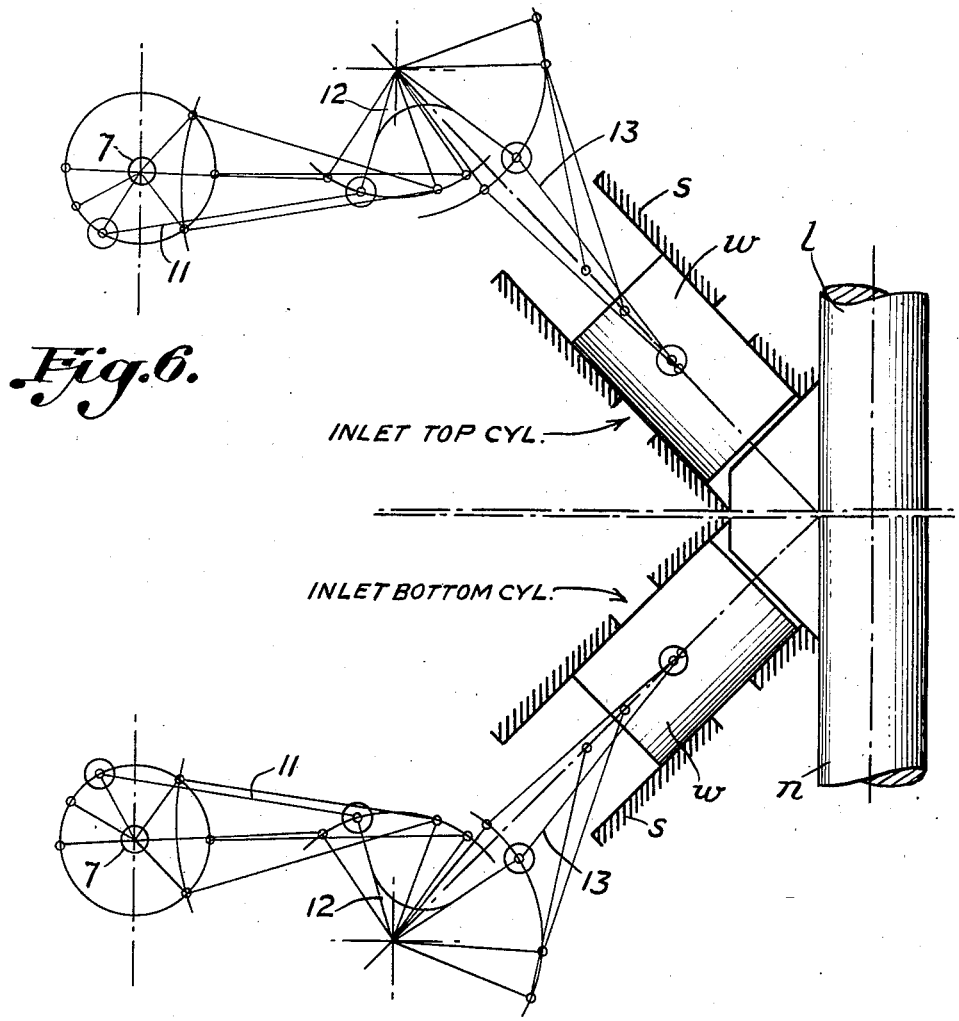
Figure 6 is a diagrammatic view illustrating the cycle of operation of the scavenging air valve for the bottom cylinder of an engine as shown in Figures 1 and 2 where the cranks are set 180° apart.
Figure 6A:
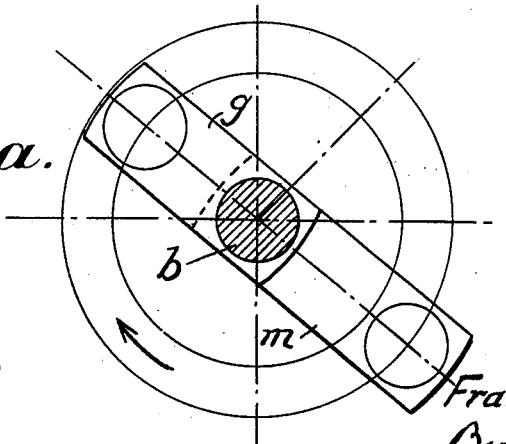
Figure 6A is a diagrammatic view illustrating the cycle of operation of the scavenging air valve for the top cylinder of an engine as shown in Figures 1 and 2 where the cranks are set 180° apart.
Figure 8:
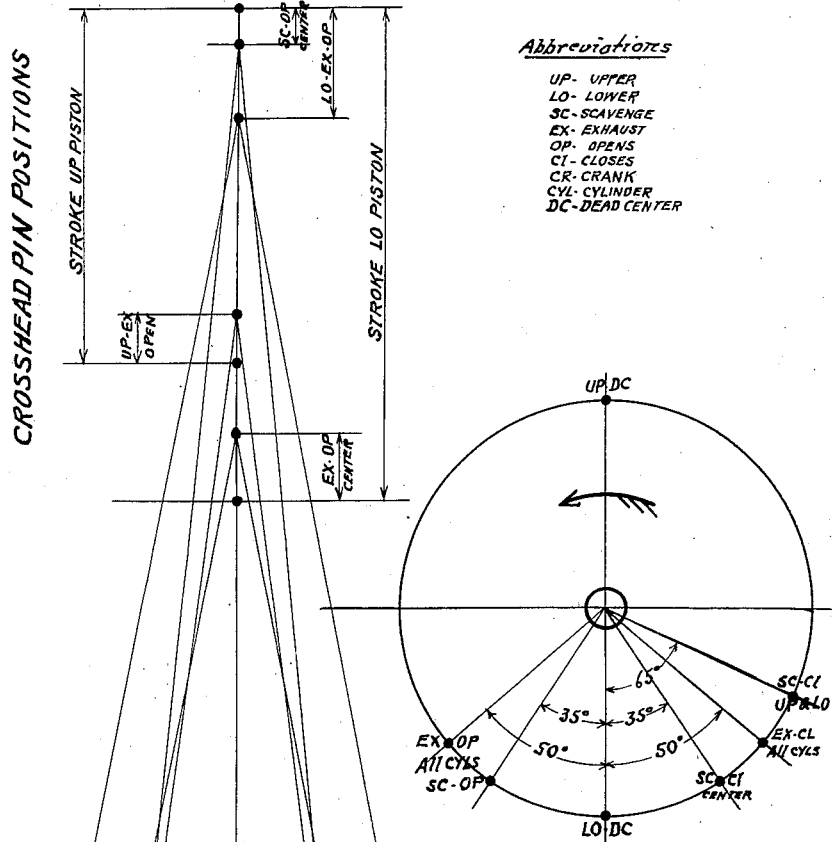
Figure 8 is a diagrammatic view showing the sequence of events more particularly scavenging and exhaust referred to crank and crosshead pins occurring in reverse operation of the engine shown in Figures 1 and 2 where the cranks are set 180° apart.
Figure 8A:
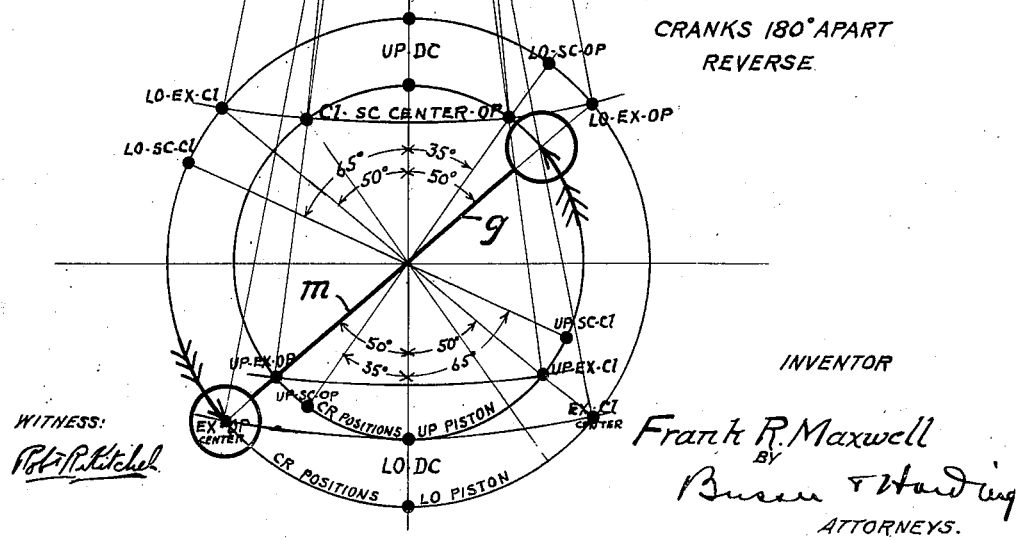
Figure 8A is a diagrammatic view showing the events shown in Figure 8 referred to a common crank.

Referring now more particularly to Figures 1 and 2, $a$ indicates the base of the engine, within which is supported a crank shaft $b$ and upon which is mounted a cylinder $c$, jacketed as at $d$ for cooling water. Within the cylinder is an upper piston $e$ and a lower piston $f$. The upper piston is connected to the cranks $g$, $g$, which are offset 15°, by means of connecting rods $h$, $h$ and the side rods $h'$, $h'$ connected to a cross head $i$ mounted in a guide $j$ formed in bracket $k$, and connected to the piston $e$ by the piston rod $l$.

The lower piston is connected to the crank $m$ by means of the piston rod $n$ and connecting rod $n'$. Guides $o$ are provided for the rods $h'$, $h'$ and for the piston rod $n$.

The cylinder $c$ is provided at its opposite ends with heads $p$, $p$, jacketed for cooling water, the piston rods $l$ and $n$, connected to the pistons $e$ and $f$, respectively pass through stuffing boxes $q$, $q$ in the cylinder heads and which are packed with any suitable heat-resistant packing $r$.

Opening through the cylinder heads $p$, $p$ are cylinders $s$, $s$, provided with ports $t$, $t$ in communication with conduits $u$, $u$ leading from a scavenging air receiver $v$ and controlled by piston valves $w$, $w$. Fuel injection nozzles $x$, $x$ extend through the cylinder heads $p$, $p$ and a fuel injection nozzle x' extends through the wall of the cylinder c between the pistons e, f.

The cylinder c is provided with a scavenging air port y, connected with the scavenging air receiver v and adapted to be controlled by the upper piston e, and with exhaust ports z and z', in communication with an exhaust manifold 2, and adapted to be controlled by the pistons e and f, respectively.

As will now be observed, the pistons e and f when they move together form an inner combustion chamber, or a center cylinder between them and in their movement apart they form outer combustion chambers, or upper and lower cylinders, with the cylinder heads p, p, respectively. The inner combustion chamber is supplied with scavenging air through the port y, controlled by the piston e, and the exhaust from the inner combustion chamber passes out through the exhaust port z' controlled by poston f. The outer combustion chambers are supplied with scavenging air under control of piston valves w, w, while the exhaust from the upper outer combustion chamber passes out through exhaust port z under control of piston e and the exhaust from the lower outer combustion chamber passes out through exhaust port z' under control of piston f.

The piston valves w, w are operated from the main crank shaft through gearing 3, which serves to drive a jack shaft 4. A shaft 5 is driven from the shaft 4 by bevel gears 6. A shaft 7 extends parallel with the cylinder c and, mounted in suitable bearings, is arranged to drive crank 8 through left-hand spiral gearing 10 and to drive crank 8' through right-hand spiral gearing 10', the cranks 8 and 8' being driven at engine speed. The cranks 8, 8' are connected through links 11, 11, in turn connected to bell crank levers 12, 12, which are pivotally mounted on the engine and which are connected to rods 13, 13, connected to the piston valves w, w.

The shaft 7, for actuation of the piston valves w, w, is driven from the shaft 5 through gears 14 and 15. The gear 15 is secured to a sleeve 16 by straight splines 20 and the sleeve is connected with shaft 5 through spiral splines 17. The outer end of the sleeve is grooved for engagement by the forked end of a hand lever 18 mounted on a suitable fulcrum pin 19. As will be obvious, by manipulation of the lever 18 the shaft 7 may be rotated relative to the shaft 5 and the main crank shaft and hence the timing of the piston valves w, w may be changed for reversal of the direction of rotation of the engine.

Referring to Figures 1 and 1A, the scavenging port y, for the inner combustion chamber between the pistons e and f, is provided with a valve 25, which, for example, may be a butterfly valve. A lever 21 is connected to the valve 25 and to a lever 23, pivotally secured at 23a to the frame of the engine, by a link 22. The lever 23 is connected to the forked end of the hand lever 18 by a link 24. As will be obvious, the valve 25 will be actuated by the lever 18. The valve 25 is so set that when the lever 18 is set for forward operation of the engine the valve will be open and so that movement of the lever to reverse the engine will effect the closing of valve 25.

Referring now to Figures 3–8, inclusive, it will be noted that Figures 3 and 6, respectively, illustrate the cycle of operation of the piston valves w, w with respect to the main crank shaft, both where the main cranks are offset 15° and where they are arranged at 180°. Figures 4–5A and Figures 7–8A, respectively, comprise diagrams showing the sequence of events in the operation of engines of the two crank arrangements.

It is believed that no detailed description of the Figures 3–8A, inclusive, is necessary, since with the application to Figures 3 and 6 of the reference letters heretofore referred to with respect to Figures 1 and 2, and the application to Figures 4–5A and 7–8A of explanatory notes, the operation of the piston valves and the sequence of events in operation of the engine according to this invention will be entirely clear.

In the operation of the engine according to this invention, for example, when installed in a ship for forward operation, scavenging air is supplied to the scavenging air receiver v and fuel is supplied for injection into the center cylinder through the fuel nozzle x' and to the upper and lower cylinders through the fuel nozzles x, x. In operation, as the pistons e, f move together compression occurs between their adjacent ends. The exhaust ports for the upper and lower cylinders are uncovered by the pistons e, f and the piston valves w, w permit the entry of scavenging air into the outer cylinders.

When the pistons e, f have reached the end of their strokes toward each other, or just before that point is reached, depending upon the timing of the engine, fuel is injected through the fuel nozzle x' and the pistons travel apart on the expansion stroke. The pistons e, f close the exhaust ports with respect to the upper and lower cylinders, the piston valves cut off the supply of air to the upper and lower cylinders and compression takes place in those cylinders. In the further movement apart of the pistons on the expansion stroke the exhaust port z' is opened by the piston f and thereafter the scavenging air port y is opened by the piston e.

When the pistons e, f have reached the end of their expansion strokes under the influence of the combustion of fuel injected through the nozzle x', fuel is injected through the fuel nozzles x, x and the pistons e, f move toward each each other under the effect of the combustion of fuel in the upper and lower cylinders. In due course the piston e uncovers the exhaust port z and the piston f uncovers the exhaust port z' for exhaust from the upper and lower cylinders, respectively, after which the piston valves w, w uncover the ports t, t for the admission of scavenging air to the upper and lower cylinders, respectively.

The timing of the piston valves w, w and of the injection of fuel through nozzles x, x, and x', for forward operation of an engine in which the main cranks are offset 15° as well as for an engine in which the main cranks are set at 180°, will be clear from an inspection of Figures 4–4A and 7–7A.

Where it is desired to operate the engine having cranks set at 180° in reverse, it is only necessary to change the timing of the fuel injection and to manipulate the hand lever 18 to effect a turning of the shaft 7 with respect to the shaft 5 and the main crank shaft, thus changing the timing of the valves w, w with respect to the pistons e, f. Normally for reverse operation the shaft 7 will be shifted about 30° with respect to the crank shaft.

Where it is desired to operate the engine with cranks offset 15° in reverse, the hand lever 18 is moved to change the timing of the valves w, w and the timing of the fuel injection to the upper and lower cylinders is changed. However, the center cylinder is not operated, since in reverse operation of an engine with cranks offset 15° the piston e will open the scavenging air port y before the piston f opens the exhaust port z' with the result that the center cylinder would initially exhaust through the scavenging air port.

When the engine with cranks offset 15° is operated in reverse with the center cylinder idle, there would ordinarily be a waste of scavenging air, since such air without function would, when the exhaust and scavenging air ports were open, enter the center cylinder and waste through the exhaust port. To prevent such waste, the valve 25 is provided and is closed to close the scavenging air port y when lever 18 is manipulated to reverse the engine.

In various uses, such as in marine use, full power in reverse is unnecessary, hence the valve 25 may be included in engines having cranks set at 180° and may be operatively connected with the reversing lever 18, as shown, or for independent manipulation where operation of the center cylinder on reverse may or may not be desired.

As will be obvious, with suitable change in timing of the engine exhaust may be emitted from the outer cylinder through the piston valves t and scavenging air admitted through the exhaust ports z and z'.

As will now be apparent, the engine in accordance with this invention is of little increased size or weight over the heretofore known opposed piston type of Diesel engine and, at the same time, is capable of delivering greatly increased power.

The engine in accordance with this invention is of simple design and may be economically constructed and operated.

It will be understood that it is not intended that this invention be limited to the details described above for illustrative purposes, it being appreciated that various modification in detail may be made without departing from the scope of the invention.

What I claim and desire to protect by Letters Patent is:

1. A Diesel engine comprising, in combination, a crank shaft, a working cylinder, a pair of opposed pistons in the cylinder, cylinder heads on opposite ends of the cylinder, pistons rods connected to the pistons respectively and extending respectively through the cylinder heads, means for connecting the piston rods with the crank shaft, a pair of longitudinally spaced exhaust ports in the cylinder adapted to be controlled by the pistons respectively, a scavenging air port for the admission of scavenging air into the cylinder between the pistons and adapted to be controlled by one of the pistons, scavenging air ports for the admission of scavenging air into the cylinder adjacent the cylinder heads, mechanically operated valve for the control of the said last mentioned scavenging air ports, a fuel injection nozzle for the injection of fuel into the cylinder between the pistons and fuel injection nozzles for the injection of fuel into the cylinder adjacent the cylinder heads.

2. A Diesel engine comprising, in combination, a crank shaft having a pair of cranks, a working cylinder, a pair of opposed pistons in the cylinder, cylinder heads on opposite ends of cylinder, piston rods connected to the pistons respectively and extending respectively through the cylinder heads, means for connecting the piston rods with the crank shaft, a pair of longitudinally spaced exhaust ports in the cylinder adapted to be controlled by the pistons respectively, a scavenging air port for the admission of scavenging air into the cylinder between the pistons and adapted to be controlled by one of the pistons, scavenging air ports for the admission of scavenging air into the cylinder adjacent the cylinder heads, mechanically operated valves for the control of the said last mentioned scavenging air ports, a fuel injection nozzle for the injection of fuel into the cylinder between the pistons and fuel injection nozzles for the injection of fuel into the cylinder adjacent the cylinder heads.

3. A Diesel engine comprising, in combination, a crank shaft, a working cylinder, a pair of opposed pistons in the cylinder, cylinder heads on opposite ends of the cylinder, piston rods connected to the pistons respectively and extending respectively through the cylinder heads, means for connecting the piston rods with the crank shaft, a pair of longitudinally spaced exhaust ports in the cylinder adapted to be controlled by the pistons respectively, a scavenging air port for the admission of scavenging air into the cylinder between the pistons and adapted to be controlled by one of the pistons, scavenging air ports for the admission of scavenging air into the cylinder adjacent the cylinder heads, mechanically operated valves for the control of said last mentioned scavenging air ports, rotary means driven from the crank shaft for operating said valves, means for shifting the angular relationship between said rotary means and said crank shaft for reverse operation of the engine, a fuel injection nozzle for the injection of fuel into the cylinder between the pistons and fuel injection nozzles for the injection of fuel into the cylinder adjacent the cylinder heads.

4. A Diesel engine in accordance with claim 1, characterized by the fact that the mechanically operated valves for controlling scavenging air ports comprise ported cylinders opening through the cylinder heads and pistons within the cylinders and adapted to be reciprocated for the control of the ports in said cylinders.

5. A Diesel engine in accordance with claim 1, characterized by the fact that the mechanically operated valves for controlling the scavenging air ports comprise ported cylinders opening through the cylinder heads and pistons within the cylinders and adapted to be reciprocated for the control of the ports in said cylinders and by the fact that the means for actuating said valves comprise a pair of bell cranks pivotally mounted adjacent the cylinder heads, rods connecting the bell cranks respectively to the pistons, cranks connected to the bell cranks respectively, a shaft adapted to rotate said cranks to effect reciprocation of said pistons, gearing for the rotation of said shaft by the crank shaft and means for changing the angular relationship between the said shaft and said crank shaft for reverse operation of the engine.

6. A Diesel engine in accordance with claim 1, characterized by the fact that the exhaust ports are so placed that as the pistons approach the end of their stroke toward each other the exhaust ports are respectively opened behind the pistons respectively and that thereafter the mechanically operated valves open the scavenging air ports for the admission of scavenging air behind the pistons respectively and by the fact that as the pistons approach the end of their strokes away from each other one of the exhaust ports is opened between the pistons and thereafter the scavenging air port controlled by one of the pistons is open between the pistons.

7. A Diesel engine according to claim 3 characterized by the fact that means operably connected with the means for shifting the angular relationship between the rotary means and the crank shaft for reverse operation of the engine are provided for closing the scavenging air port for the admission of scavenging air into the cylinder between the pistons, said means being independent of the piston controlling said scavenging air port.

8. A Diesel engine according to claim 1 characterized by the fact that means are provided for closing the scavenging air port for the admission of scavenging air into the cylinder between the pistons, said means being independent of the piston controlling said scavenging air port.

9. A Diesel engine comprising, in combination, a crank shaft, a working cylinder, a pair of opposed pistons in the cylinder, cylinder heads on opposite ends of the cylinder, piston rods connected to the pistons respectively and extending respectively through the cylinder heads, means for connecting the piston rods with the crank shaft, longitudinally spaced ports in the cylinder to be controlled by the inner faces of the pistons respectively for emission of exhaust gases and admission of scavenging air for the central combustion chamber, ports in the cylinder controlled by the outer faces of the pistons for the emission of exhaust gases and admission of scavenging air for the end combustion chambers.

10. A Diesel engine comprising, in combination, a crank shaft, a working cylinder, a pair of opposed pistons in the cylinder, cylinder heads on opposite ends of the cylinder, piston rods connected to the pistons respectively and extending respectively through the cylinder heads, means for connecting the piston rods with the crank shaft, longitudinally spaced ports in the cylinder to be controlled by the inner faces of the pistons respectively for emission of exhaust gases and admission of scavenging air for the central combustion chamber, ports in the cylinder controlled by the outer faces of the pistons and ports adjacent the cylinder heads controlled by mechanically operated valves.

11. A Diesel engine comprising, in combination, a crank shaft, a working cylinder, a pair of opposed pistons in the cylinder, cylinder heads on opposite ends of the cylinder, piston rods connected to the pistons respectively and extending respectively through the cylinder heads, means for connecting the piston rods with the crank shaft, a pair of longitudinally spaced service ports in the cylinder adapted to be controlled by the pistons respectively, a scavenging air port for the admission of scavenging air into the cylinder between the pistons and adapted to be controlled by one of the pistons, service ports in the cylinder adjacent the cylinder heads, a fuel injection nozzle for the injection of fuel into the cylinder between the pistons, and fuel injection nozzles for the injection of fuel into the cylinder adjacent the cylinder heads, said engine being also characterized by the fact that means are provided for closing the scavenging air port for the admission of scavenging air into the cylinder between the pistons, said means being independent of the piston controlling said scavenging air port.

12. A Diesel engine comprising, in combination, a crank shaft, a working cylinder, a pair of opposed pistons in the cylinder, cylinder heads on opposite ends of the cylinder, piston rods connected to the pistons respectively, means for connecting the piston rods with the crank shaft, a pair of longitudinally spaced service ports in the cylinder adapted to be controlled by the pistons respectively, a service port in the cylinder between the pistons and adapted to be controlled by one of the pistons, service ports in the cylinder adjacent the cylinder heads, mechanically operated valves for the control of the said last mentioned service ports, a fuel injection nozzle for the injection of fuel into the cylinder between the pistons and fuel injection nozzles for the injection of fuel into the cylinder adjacent the cylinder heads.

FRANK R. MAXWELL.